(12) United States Patent
Wu

(10) Patent No.: US 7,630,194 B1
(45) Date of Patent: Dec. 8, 2009

(54) DISPLAY MODULE CAPABLE OF ADJUSTING LOCATION OF AN OPENING OF AN ELECTRONIC DEVICE

(75) Inventor: Chih-Shiun Wu, Taipei Country (TW)

(73) Assignee: Micro-Star Int'l Co., Ltd., Jung-He, Taipei Hsien (TW)

( * ) Notice: Subject to any disclaimer, the term of this patent is extended or adjusted under 35 U.S.C. 154(b) by 0 days.

(21) Appl. No.: 12/249,959

(22) Filed: Oct. 12, 2008

(30) Foreign Application Priority Data

May 19, 2008 (TW) .............................. 97208697 U

(51) Int. Cl.
  *H05K 5/00* (2006.01)
  *H05K 7/00* (2006.01)
(52) U.S. Cl. ............................. 361/679.21; 361/679.27; 361/679.32; 361/679.33
(58) Field of Classification Search ............ 361/679.21, 361/679.27, 679.32, 679.33
See application file for complete search history.

(56) References Cited

U.S. PATENT DOCUMENTS 6,657,857 B2 * 12/2003 Lan ........................ 361/679.33
6,741,457 B2 * 5/2004 Huang ................... 361/679.32

* cited by examiner

*Primary Examiner*—Jayprakash N Gandhi
*Assistant Examiner*—Anthony M Haughton
(74) *Attorney, Agent, or Firm*—Winston Hsu

(57) ABSTRACT

A display module includes a display device, a chest, and a linkage device. A first opening is formed at a display side of the display device. The chest includes a case, an electronic device installed inside the case, a frame fixed to the case and disposed at a side of the electronic device, and a chassis pivotally connected to a first guide rail of the frame. The electronic device has a second opening. The chassis is used for holding the electronic device. The linkage device pivots at the chassis and is fixed to the case and the display device. The linkage device is used for driving the chassis to move along the first guide rail of the frame when the first opening rotates to a first location so that the second opening moves to a second location corresponding to the first location accordingly.

22 Claims, 15 Drawing Sheets

DISPLAY MODULE CAPABLE OF ADJUSTING LOCATION OF AN OPENING OF AN ELECTRONIC DEVICE

BACKGROUND OF THE INVENTION

1. Field of the Invention

The present invention relates to a display module, and more specifically, to a display module capable of adjusting a location of an opening of an electronic device.

2. Description of the Prior Art

With rapid development of electronic technology, a variety of integrated electronic products are manufactured accordingly. An LCD-PC is one of the most representative examples among these integrated electronic products. The so-called LCD-PC involves integrating all components in a computer mainframe, such as a CPU, a motherboard, an optical disk drive, and so forth, into an LCD. Therefore, the LCD-PC has advantages of reducing space occupied by the computer mainframe and being easy to carry.

As configuration space of the LCD-PC is limited, a common configuration for a disk drive installed in the LCD-PC, such as an optical disk drive or a card reading drive, is to dispose the disk drive in a side of the LCD-PC. In such a configuration, an insertion opening of the disk drive is located at the side of the LCD-PC. However, since the user can not see the insertion opening directly, the said configuration may make it difficult for a user to insert a storage medium (such as an optical disk) into the insertion opening of the disk drive through an opening of the LCD-PC smoothly, and therefore the surface of the storage medium may be scratched easily. Another configuration is disposal of the disk drive at a display side of the LCD-PC. In this configuration, the insertion opening of the disk drive is located at the display side of the LCD-PC. However, when the user adjusts a display angle of an LCD screen of the LCD-PC, this configuration may cause a problem that an opening of the LCD-PC cannot be aligned with the insertion opening of the disk drive. Thus, the storage medium can not be inserted into the insertion opening through the opening since the opening and the insertion opening cannot be aligned with each other. If the said configuration is changed to enlarge the opening of the LCD-PC to make sure that the storage medium may be inserted into the insertion opening through the opening, appearance quality may be reduced accordingly.

SUMMARY OF THE INVENTION

The present invention provides a display module capable of adjusting a location of an opening of an electronic device, the display module comprising a display device, a first opening being formed at a display side of the display device; a chest disposed at a side of the display device opposite to the display side comprising a case; an electronic device installed inside the case, the electronic device having a second opening corresponding to the first opening; a frame fixed to the case and disposed at a side of the electronic device, the frame having a first guide rail; and a chassis pivotally connected to the first guide rail of the frame for holding the electronic device; and a linkage device pivotally connected to the chassis and fixed to the case and the display device for driving the chassis to move along the first guide rail of the frame when the first opening of the display device rotates to a first location so as to move the second opening of the electronic device to a second location corresponding to the first location.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
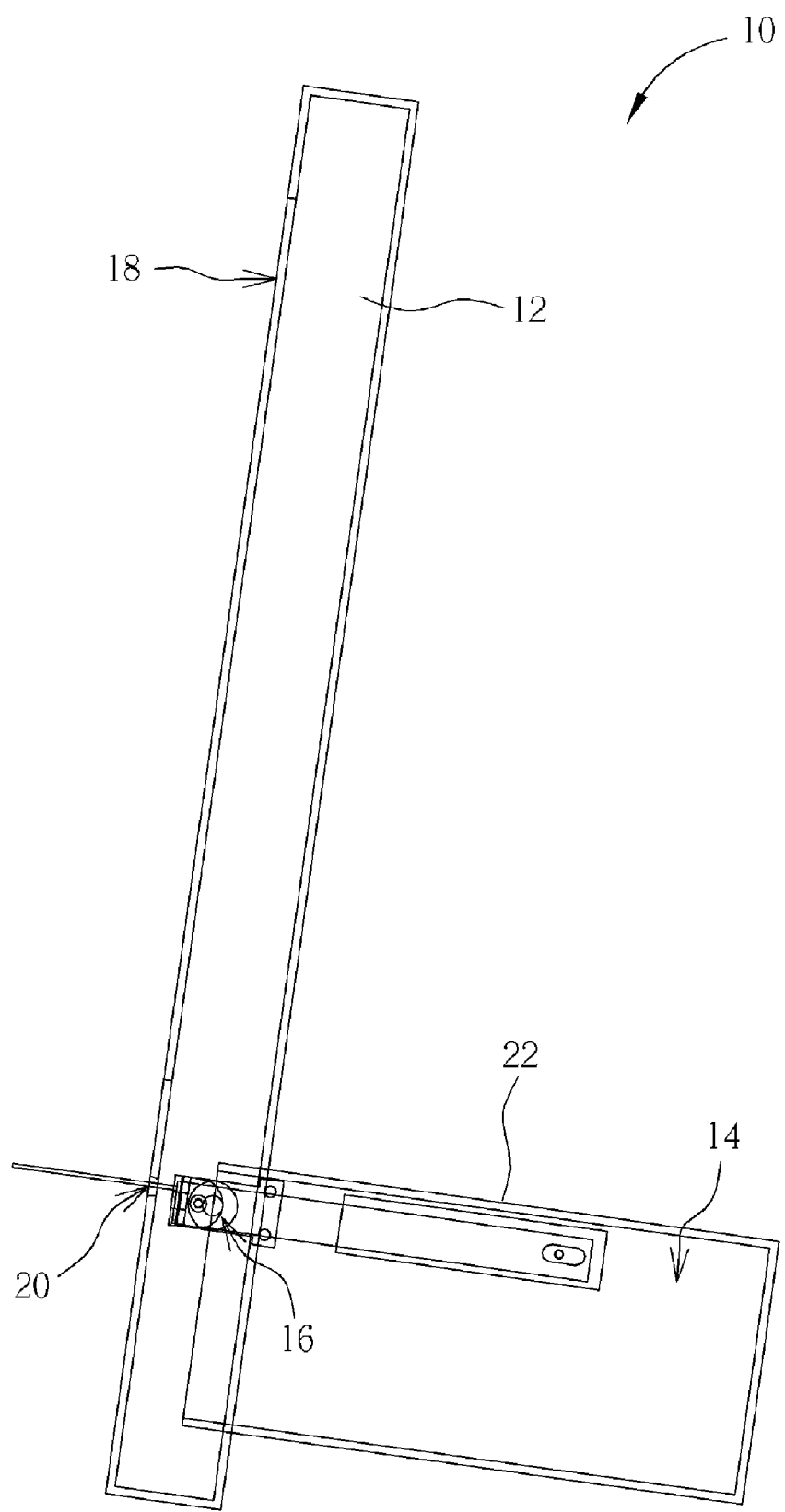
FIG. 1 is a perspective diagram of a display module according to the first embodiment of the present invention.
Figure 2:
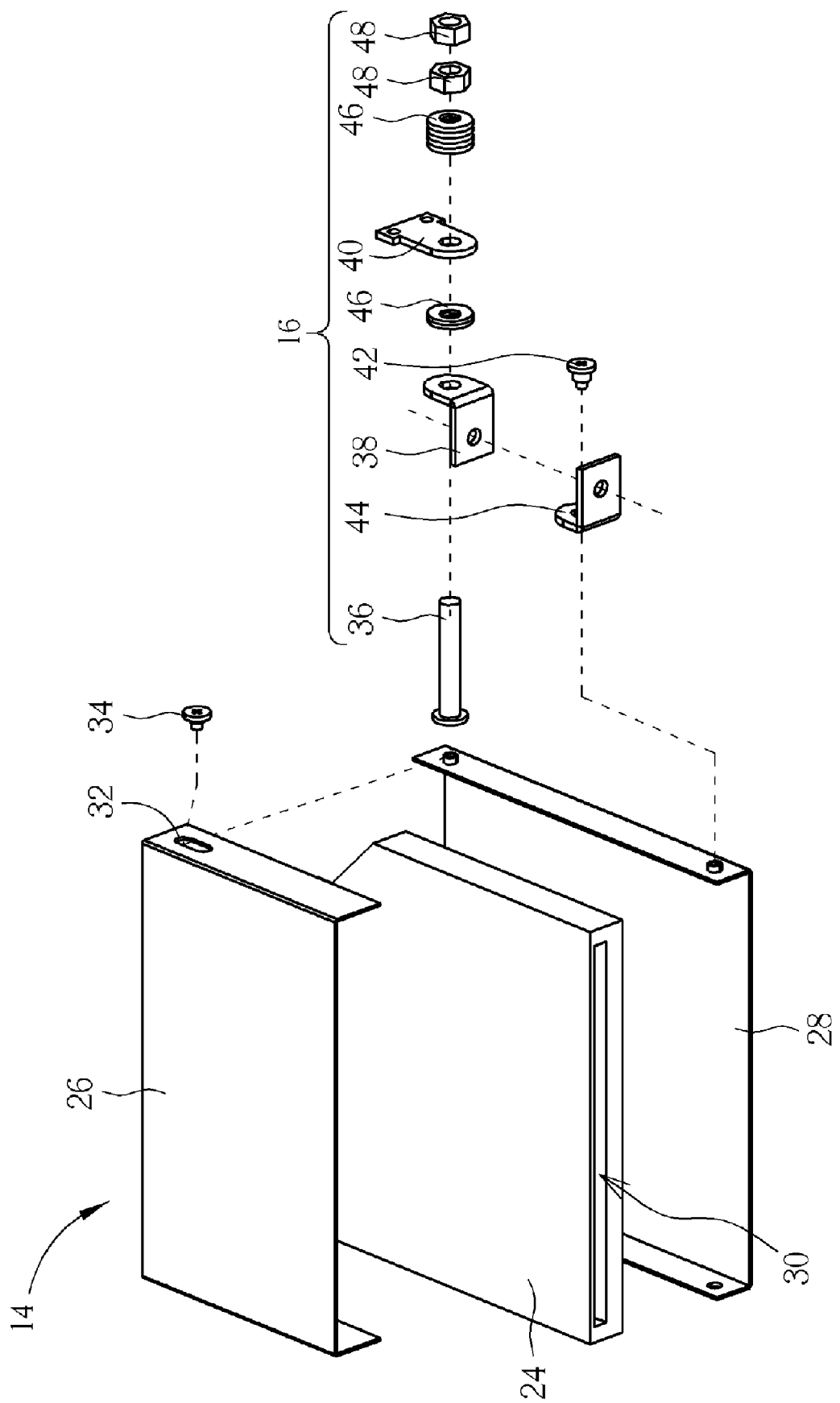
FIG. 2 is an exploded diagram of the chest and the linkage device in FIG. 1.

Please refer to FIG. 1. FIG. 1 is a perspective diagram of a display module 10 according to a first embodiment of the present invention. The display module 10 comprises a display device 12, a chest 14, and a linkage device 16. A first opening 20 is formed at a display side 18 of the display device 12. The display device 12 may be an LCD (Liquid Crystal Display). The chest 14 is disposed at a side of the display device 12 opposite to the display side 18. Next, please refer to FIG. 2. FIG. 2 is an exploded diagram of the chest 14 and the linkage device 16 in FIG. 1. As shown in FIG. 2, the chest 14 comprises a case 22 (as shown in FIG. 1), an electronic device 24, a frame 26, and a chassis 28. The electronic device 24 is installed inside the case 22. The electronic device 24 has a second opening 30 corresponding to the first opening 20 of the display device 12. The electronic device 24 may be a disk drive, such as an optical disk drive, a card reading drive, and so forth. The frame 26 is fixed to the case 22 and disposed at a side of the electronic device 24. The frame 26 has a first guide rail 32. The chassis 28 is used for holding the electronic device 24. As shown in FIG. 2, the chest 14 further comprises a first screw 34. The first screw 34 is fixed to the chassis 28 and pivots at the frame 26 for allowing the chassis 28 to move along the first guide rail 32 of the frame 26. As shown in FIG. 1 and FIG. 2, the linkage device 16 pivots at the chassis 28 and is fixed to the case 22 and the display device 12. In this embodiment, the linkage device 16 may be a rotating shaft mechanism. The linkage device 16 comprises a rotating shaft 36, a first fixing base 38, a second fixing base 40, a second screw 42, a third fixing base 44, and at least one positioning part 46. The first fixing base 38 pivots at the rotating shaft 36. The second fixing base 40 is disposed through the rotating shaft 36 and fixed to the case 22 of the chest 14 (as shown in FIG. 1). The second screw 42 is fixed to the chassis 28 and pivots at the third fixing base 44 for allowing the chassis 28 to rotate relative to the third fixing base 44. The first fixing base 38 and the third fixing base 44 are fixed to the display device 12 in a stacking and locking manner. That is, the first fixing base 38 and the third fixing base 44 move with the display device 12 together. The positioning part 46 is disposed through the rotating shaft 36. The positioning part 46 is used for providing friction force to the first fixing base 38. In this embodiment, the positioning part 46 may be a friction pad. Furthermore, as shown in FIG. 2, the linkage device 16 further comprises a screw nut 48. The screw nut 48 is locked to the rotating shaft 36 for adjusting the friction force provided from the positioning part 46.

Figure 3:
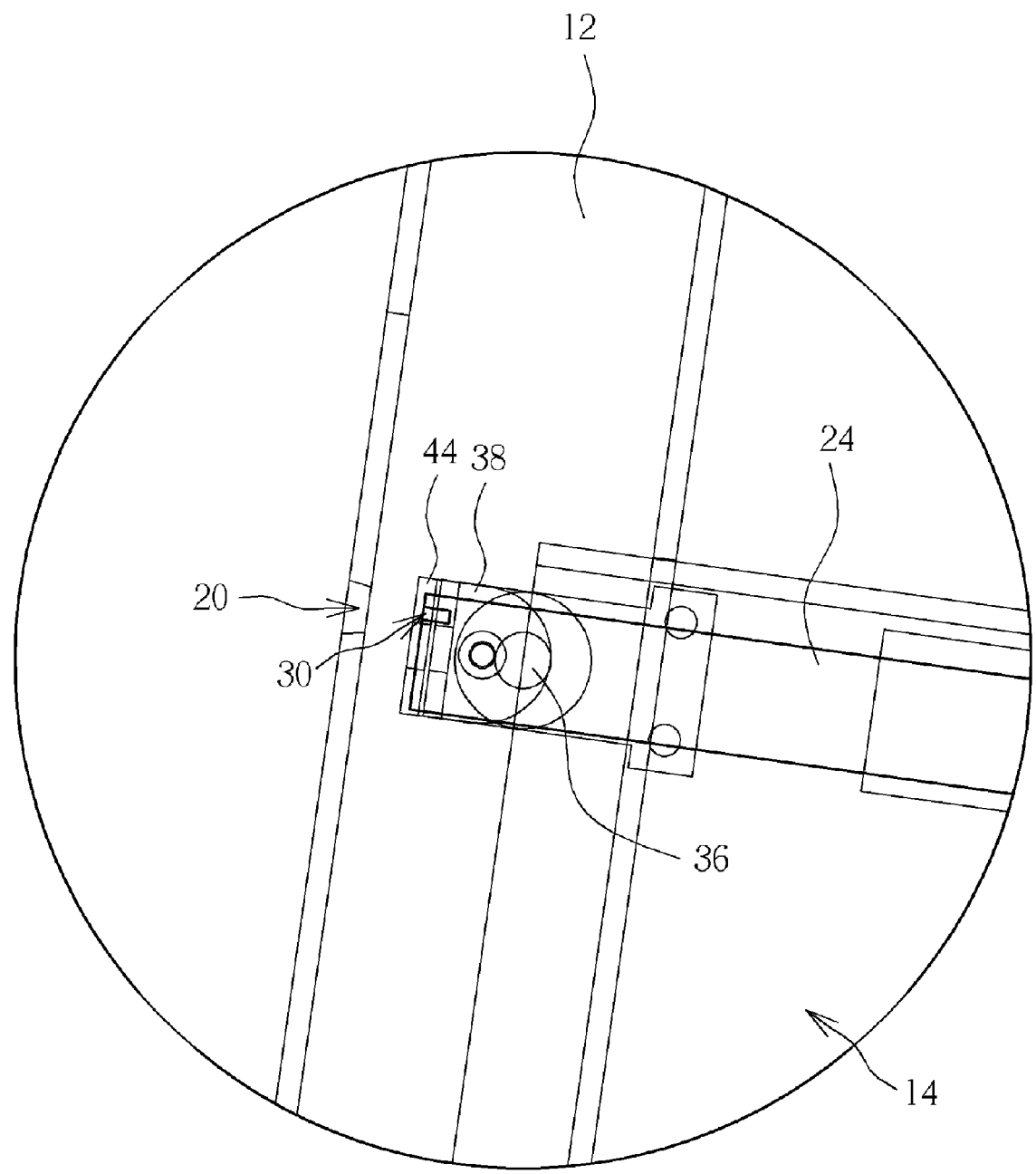
FIG. 3 is a partial enlarged diagram of the display module in FIG. 1.
Figure 4:
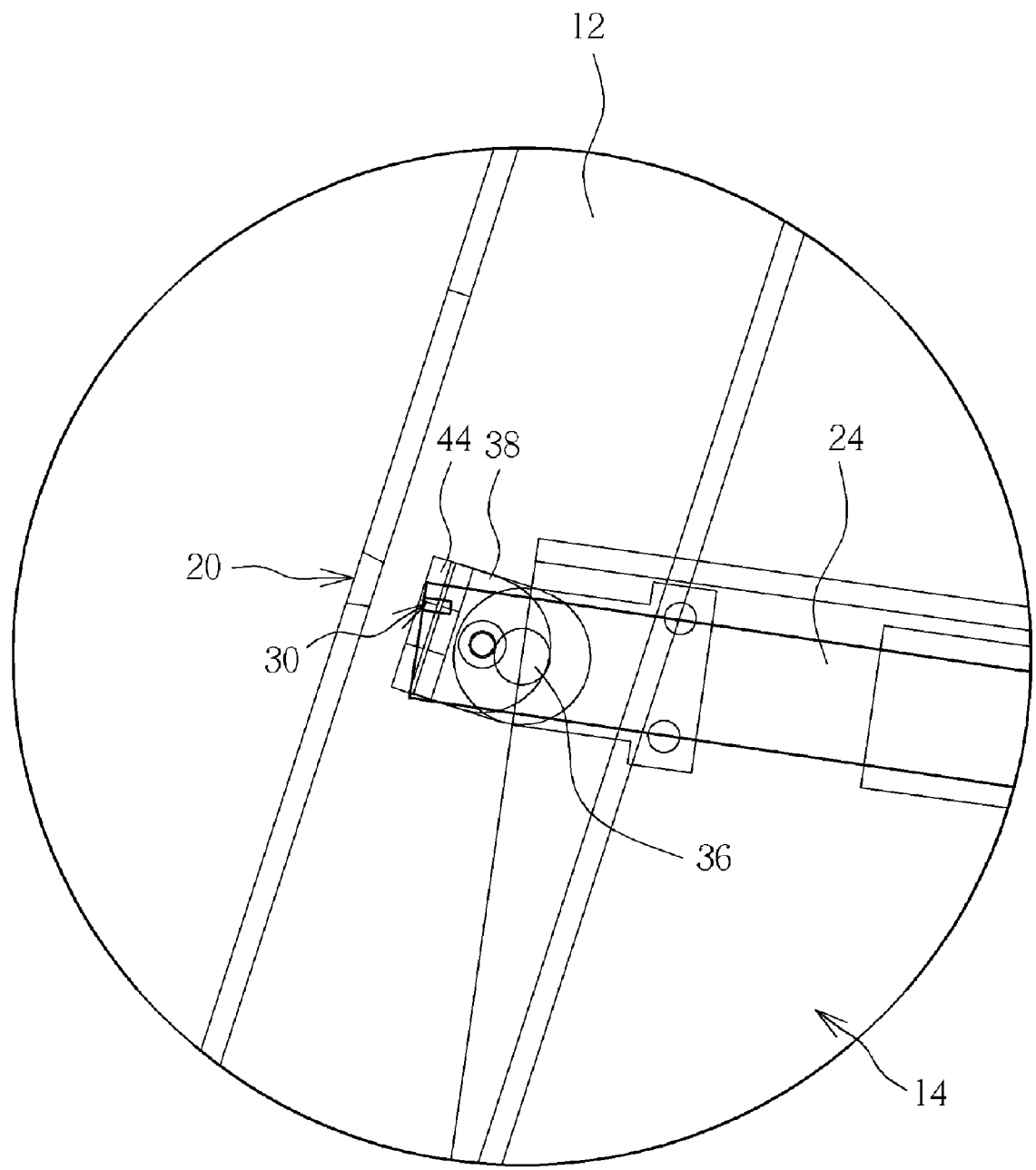
FIG. 4 is a partial perspective diagram of the display device and the chest after the display device in FIG. 1 rotates an angle clockwise relative to the chest.
Figure 5:
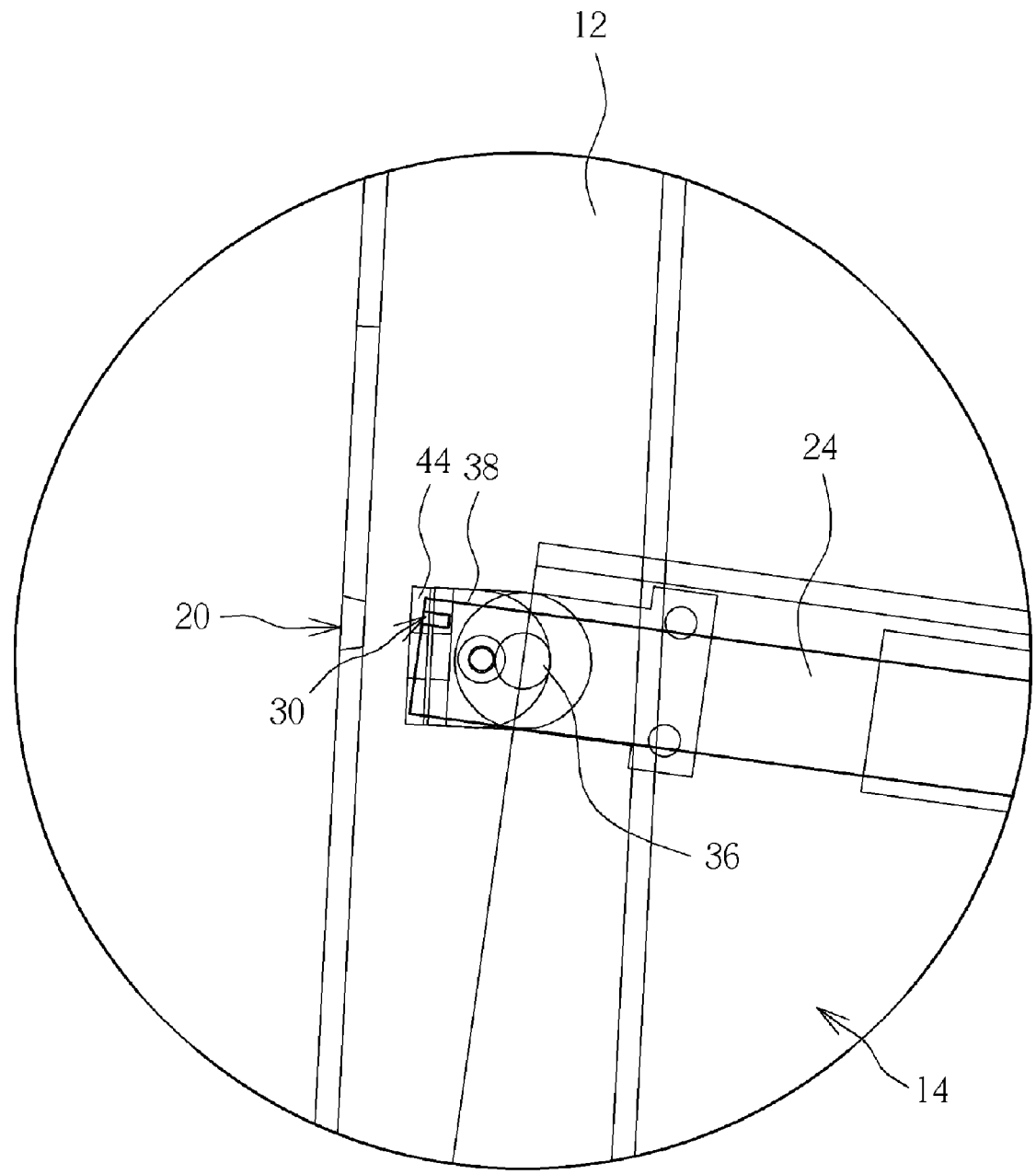
FIG. 5 is a partial perspective diagram of the display device and the chest after the display device in FIG. 1 rotates an angle counterclockwise relative to the chest.

Next, more detailed description for the display device 12, the chest 14, and the linkage device 16 is provided as follows. Please refer to FIG. 3 and FIG. 4. FIG. 3 is a partial enlarged diagram of the display module 10 in FIG. 1. FIG. 4 is a partial perspective diagram of the display device 12 and the chest 14 after the display device 12 in FIG. 1 rotates an angle clockwise relative to the chest 14. As shown in FIG. 3 and FIG. 4, when the user pushes the display device 12 to rotate from a location shown in FIG. 3 to a location shown in FIG. 4 clockwise, the first opening 20 of the display device 12 may rotate to a location shown in FIG. 4 relative to the rotating shaft 36. At the same time, the third fixing base 44 and the first fixing base 38 may also rotate relative to the rotating shaft 36 with the rotation of the display device 12, since the third fixing base 44 of the linkage device 16 is connected to the first fixing base 38 and the display device 12. Further, the third fixing base 44 pivots at the chassis 28 (as shown in FIG. 2), and the chassis 28 may move along the first guide rail 32 of the frame 26. Therefore, when the first opening 20 of the display device 12 rotates to a location shown in FIG. 4 relative to the rotating shaft 36, the third fixing base 44 may drive the chassis 28 to slide in the first guide rail 32 and rotate relative to the first guide rail 32 at the same time for moving the second opening 30 of the electronic device 24 to a location shown in FIG. 4. After the first opening 20 of the display device 12 and the second opening 30 of the electronic device 24 move from the locations shown in FIG. 3 to the locations shown in FIG. 4 respectively, the first opening 20 and the second opening 30 may be positioned at the locations shown in FIG. 4 via the friction force provided from the positioning part 46. As shown in FIG. 4, the positioned locations of the first opening 20 and the second opening 30 have the same horizontal height. To summarize, even though the user pushes the display device 12 to rotate clockwise relative to the chest 14 so as to cause the first opening 20 of the display device 12 to shift to the location shown in FIG. 4, the display module 10 still may drive the second opening 30 to move to the location shown in FIG. 4 via the connection of the third fixing base 44 and the display device 12 and thereby cause the first opening 20 and the second opening 30 to be located at the same horizontal height. In such a manner, the prior art problem may be solved, since the first opening 20 may be aligned with the second opening 30 at the same horizontal height via the aforementioned mechanism. Similarly, even if the user pushes the display device 12 to rotate counterclockwise relative to the chest 14 (as shown in FIG. 5), the display module 10 may still utilize the connection of the third fixing base 44 and the display device 12 to align the second opening 30 to the first opening 20 that is shifted a distance accordingly, so that the said storage medium may be inserted smoothly into the second opening 30 through the first opening 20.

Figure 6:
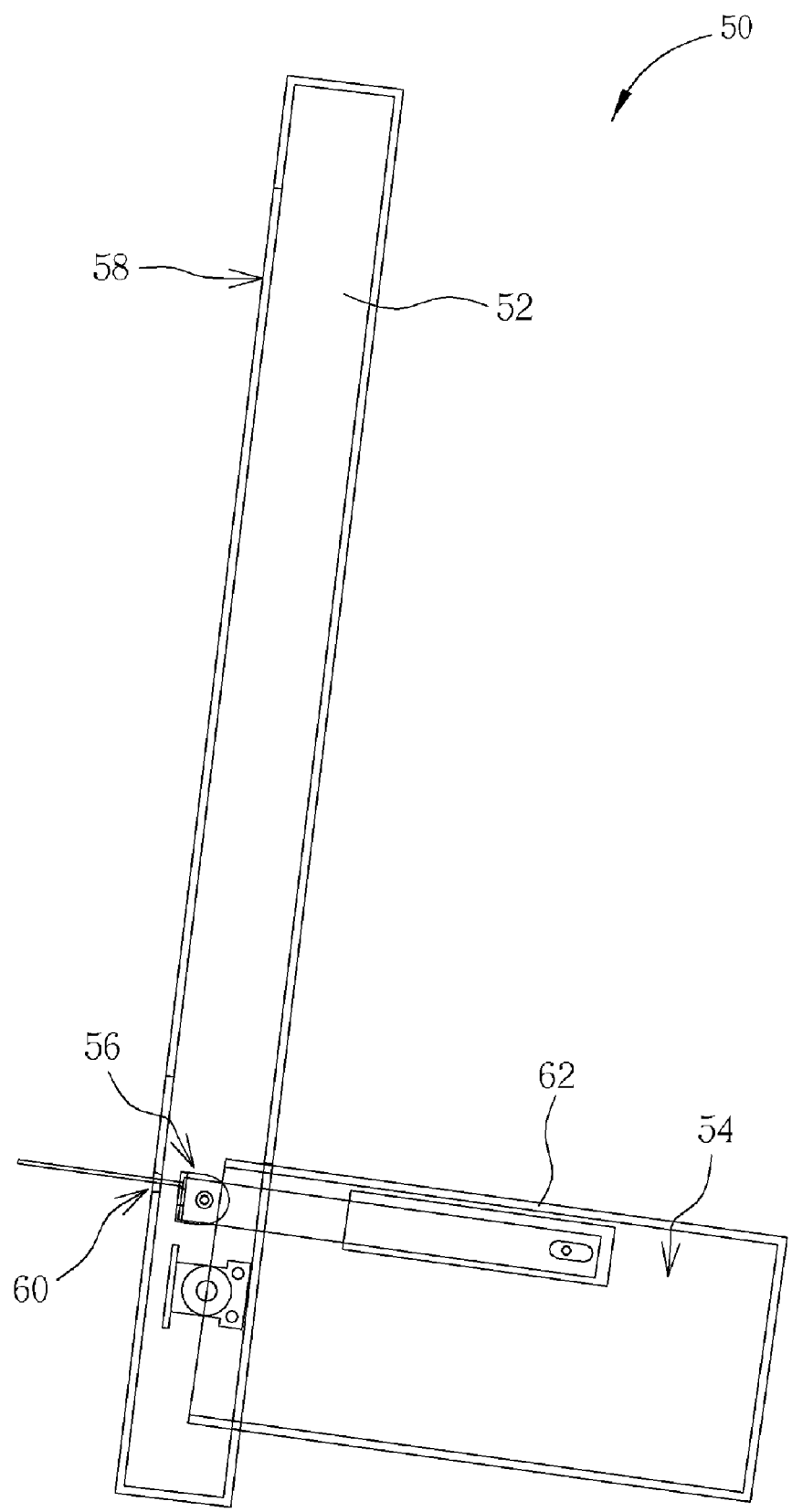
FIG. 6 is a perspective diagram of a display module according to the second embodiment of the present invention.
Figure 7:
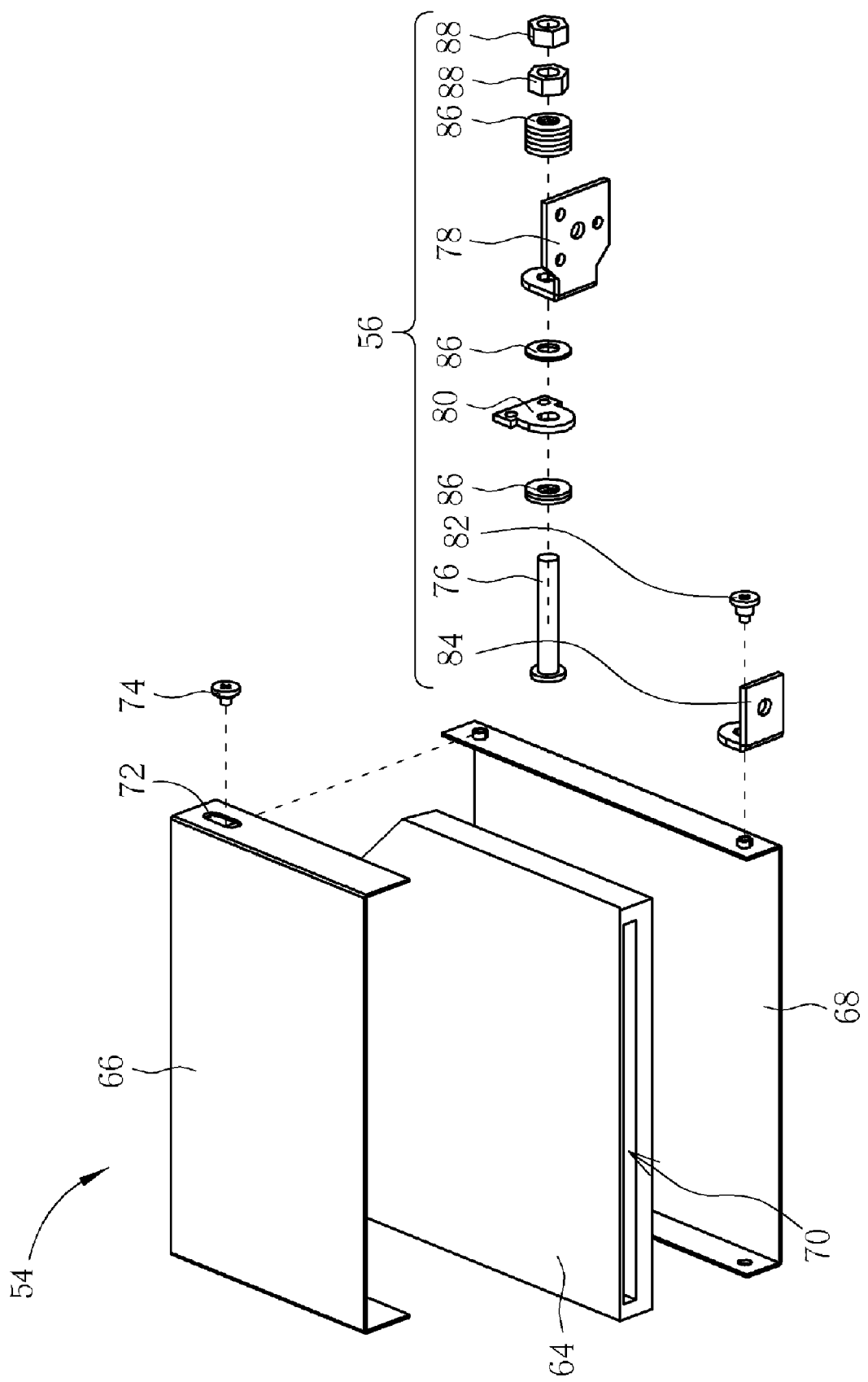
FIG. 7 is an exploded diagram of the chest and the linkage device in FIG. 6.

Next, please refer to FIG. 6. FIG. 6 is a perspective diagram of a display module 50 according to a second embodiment of the present invention. The display module 50 comprises a display device 52, a chest 54, and a linkage device 56. A first opening 60 is formed at a display side 58 of the display device 52. The display device 52 may be an LCD. The chest 54 is disposed a side of the display device 52 opposite to the display side 58. Next, please refer to FIG. 7. FIG. 7 is an exploded diagram of the chest 54 and the linkage device 56 in FIG. 6. As shown in FIG. 7, the chest 54 comprises a case 62 (As shown in FIG. 1), an electronic device 64, a frame 66, and a chassis 68. The electronic device 64 is installed inside the case 62. The electronic device 64 has a second opening 70 corresponding to the first opening 60 of the display device 52. The electronic device 64 may be a disk drive, such as an optical disk drive, a card reading drive, and so forth. The frame 66 is fixed to the case 62 and disposed a side of the electronic device 64. The frame 66 has a first guide rail 72. The chassis 68 is used for holding the electronic device 64. As shown in FIG. 7, the chest 54 further comprises a first screw 74. The first screw 74 is fixed to the chassis 68 and pivots at the frame 66 for allowing the chassis 68 to move along the first guide rail 72 of the frame 66. As shown in FIG. 6 and FIG. 7, the linkage device 56 pivots at the chassis 68 and fixed to the case 62 and the display device 52. In this embodiment, the linkage device 56 may be a rotating shaft mechanism. The linkage device 56 comprises a rotating shaft 76, a first fixing base 78, a second fixing base 80, a second screw 82, a third fixing base 84, and at least one positioning part 86. The first fixing base 78 pivots at the rotating shaft 76. The second fixing base 80 is disposed through the rotating shaft 76 and fixed to the case 62 of the chest 54 (as shown in FIG. 7). The second screw 82 is fixed to the chassis 68 and pivots at the third fixing base 84 for allowing the chassis 68 to rotate relative to the third fixing base 84. The third fixing base 84 is connected to the display device 52. That is, the third fixing base 84 moves with the display device 52 together. The positioning part 86 is disposed through the rotating shaft 76. The positioning part 86 is used for providing friction force to the first fixing base 78. In this embodiment, the positioning part 86 may be a friction pad. Furthermore, as shown in FIG. 7, the linkage device 56 further comprises a screw nut 88. The screw nut 88 is locked to the rotating shaft 76 for adjusting the friction force provided from the positioning part 86.

Figure 8:
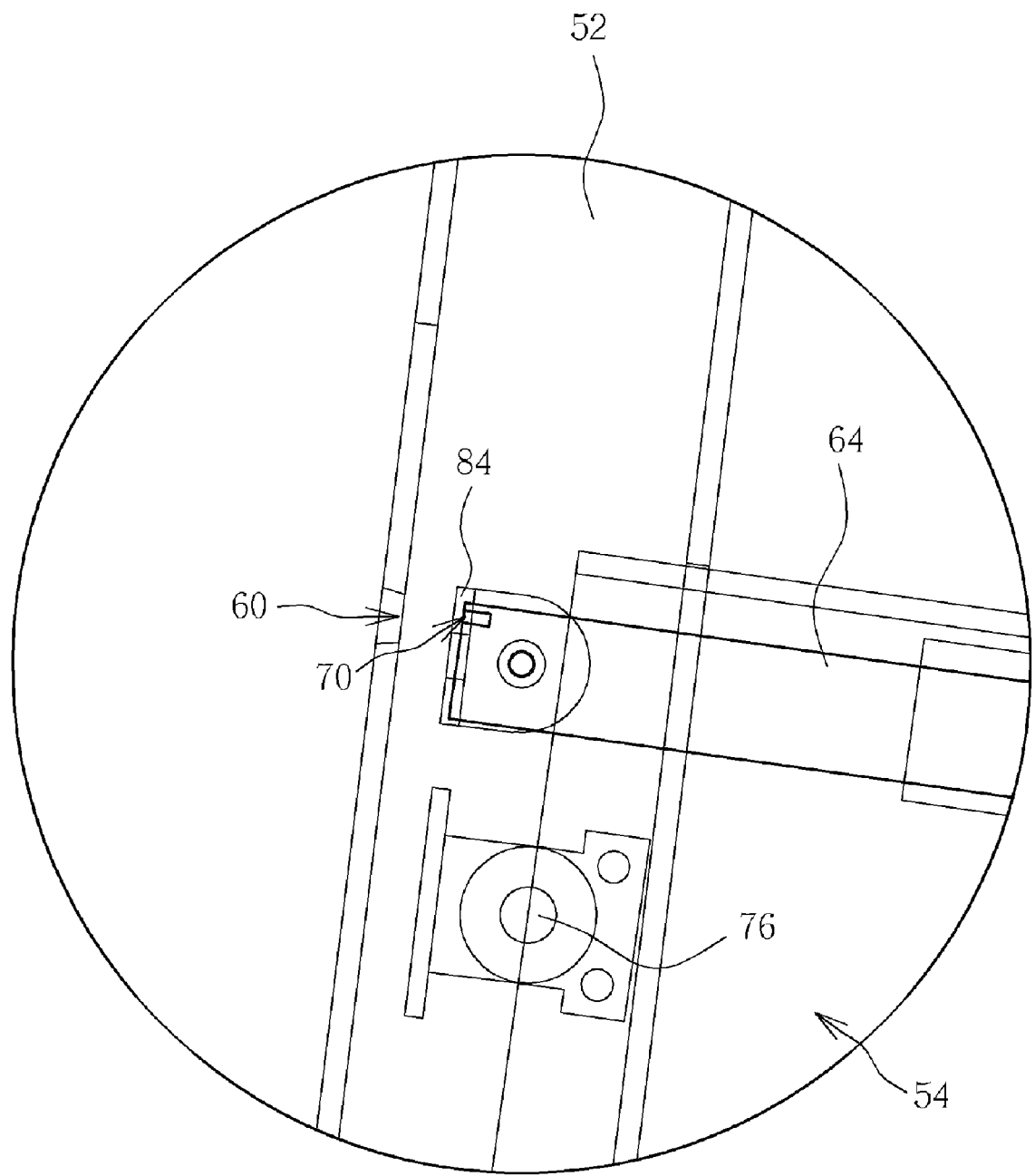
FIG. 8 is a partial enlarged diagram of the display module in FIG. 6.
Figure 9:
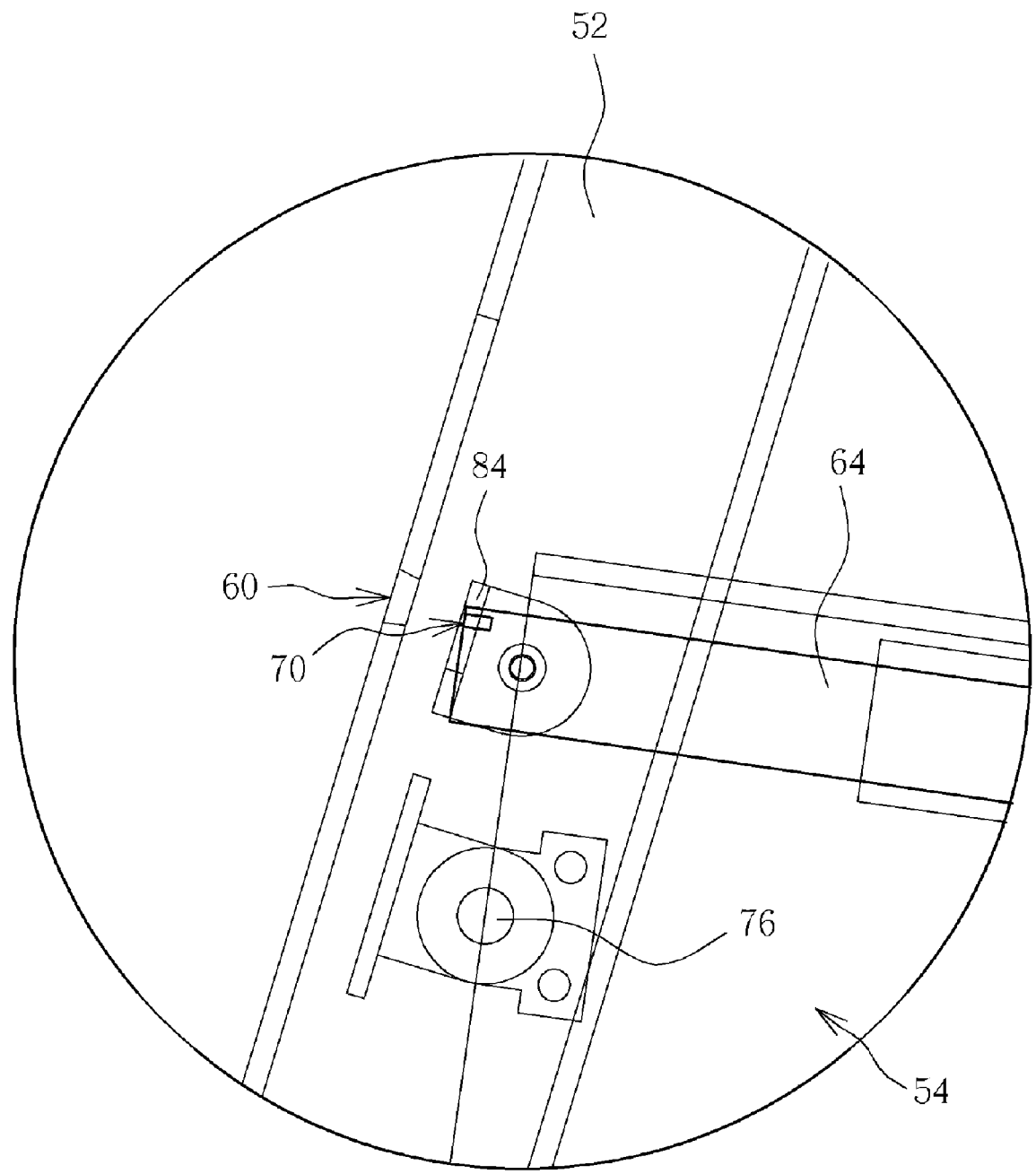
FIG. 9 is a partial perspective diagram of the display device and the chest after the display device in FIG. 6 rotates an angle clockwise relative to the chest.
Figure 10:
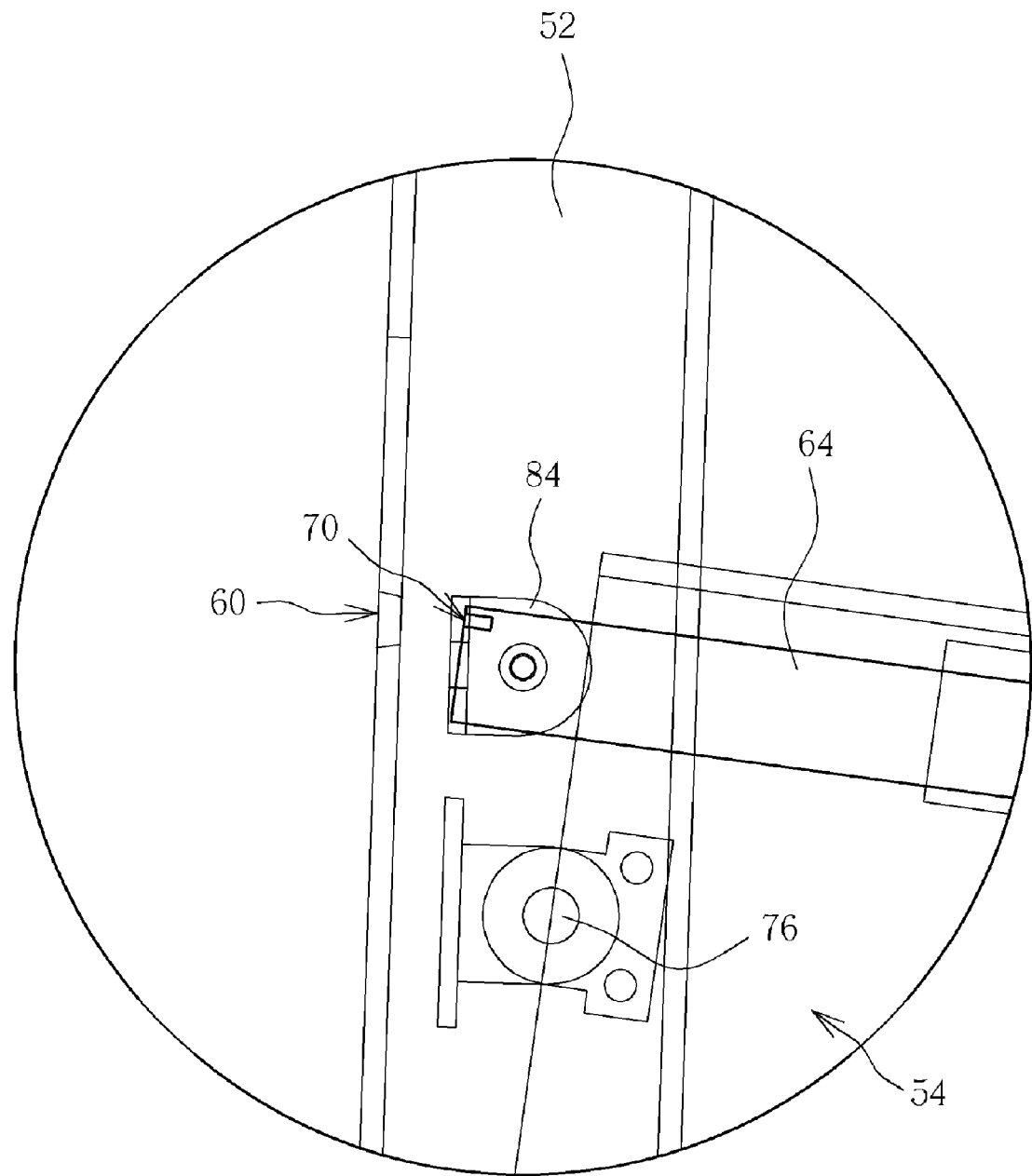
FIG. 10 is a partial perspective diagram of the display device and the chest after the display device in FIG. 6 rotates an angle counterclockwise relative to the chest.

Next, more detailed description for the display device 52, the chest 54, and the linkage device 56 is provided as follows. Please refer to FIG. 8 and FIG. 9. FIG. 8 is a partial enlarged diagram of the display module 50 in FIG. 6. FIG. 9 is a partial perspective diagram of the display device 52 and the chest 54 after the display device 52 in FIG. 6 rotates an angle clockwise relative to the chest 54. As shown in FIG. 8 and FIG. 9, when the user pushes the display device 52 to rotate from a location shown in FIG. 8 to a location shown in FIG. 9 clockwise, the first opening 60 of the display device 52 may rotate to a location shown in FIG. 9 relative to the rotating shaft 76. At the same time, the third fixing base 84 may also rotate relative to the rotating shaft 76 with the rotation of the display device 52 since the third fixing base 84 of the linkage device 56 is connected to the display device 52. Further, as mentioned above, the third fixing base 84 pivots at the chassis 28 (as shown in FIG. 7), and the chassis 68 may move along the first guide rail 72 of the frame 66. Therefore, when the first opening 60 of the display device 52 rotates to the location shown in FIG. 9 relative to the rotating shaft 76, the third fixing base 84 may drive the chassis 68 to slide in the first guide rail 72 and rotate relative to the first guide rail 72 at the same time for moving the second opening 70 of the electronic device 64 to the location shown in FIG. 9. After the first opening 60 of the display device 52 and the second opening 70 of the electronic device 64 move from the locations shown in FIG. 9 to the locations shown in FIG. 4 respectively, the first opening 60 and the second opening 70 may be positioned at the locations shown in FIG. 9 via the friction force provided from the positioning part 86. As shown in FIG. 9, the positioned locations of the first opening 60 and the second opening 70 have the same horizontal height. To summarize, even though the user pushes the display device 52 to rotate clockwise relative to the chest 54 so as to shift the first opening 60 to the location shown in FIG. 9, the display module 50 still may drive the second opening 70 to move to the location shown in FIG. 9 via the connection of the third fixing base 84 and the display device 52 and thereby cause the first opening 60 and the second opening 70 to be located at the same horizontal height. In such a manner, the prior art problem may be solved since the first opening 60 may be aligned with the second opening 70 at the same horizontal height via the aforementioned mechanism. Similarly, even if the user pushes the display device 52 to rotate counterclockwise relative to the chest 54 (as shown in FIG. 10), the display module 50 may still utilize the connection of the third fixing base 84 and the display device 52 to align the second opening 70 to the first opening 60 that is shifted a distance accordingly, so that the said storage medium may be inserted smoothly into the second opening 70 through the first opening 60.

Figure 11:
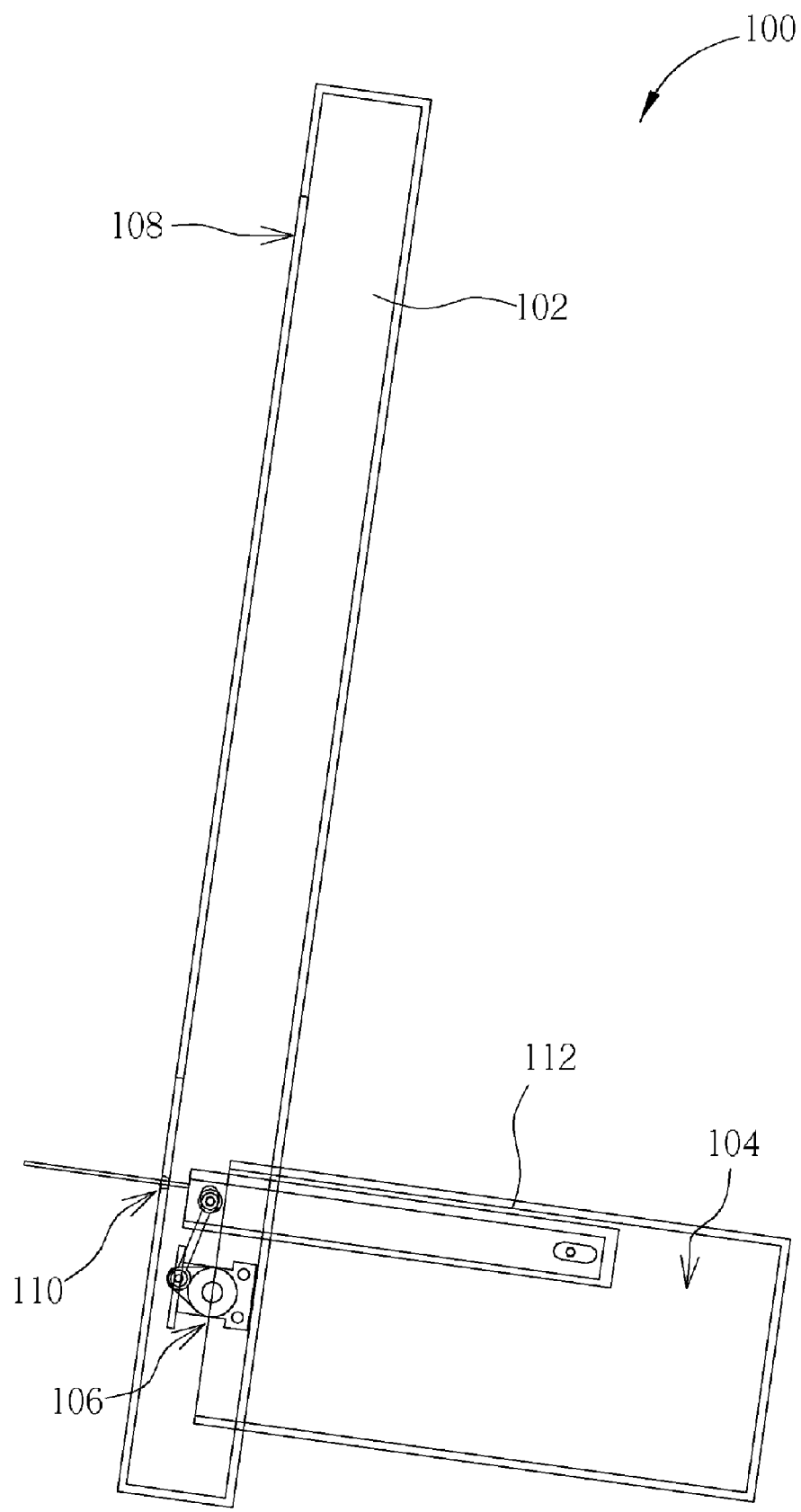
FIG. 11 is a perspective diagram of a display module according to the third embodiment of the present invention.
Figure 12:
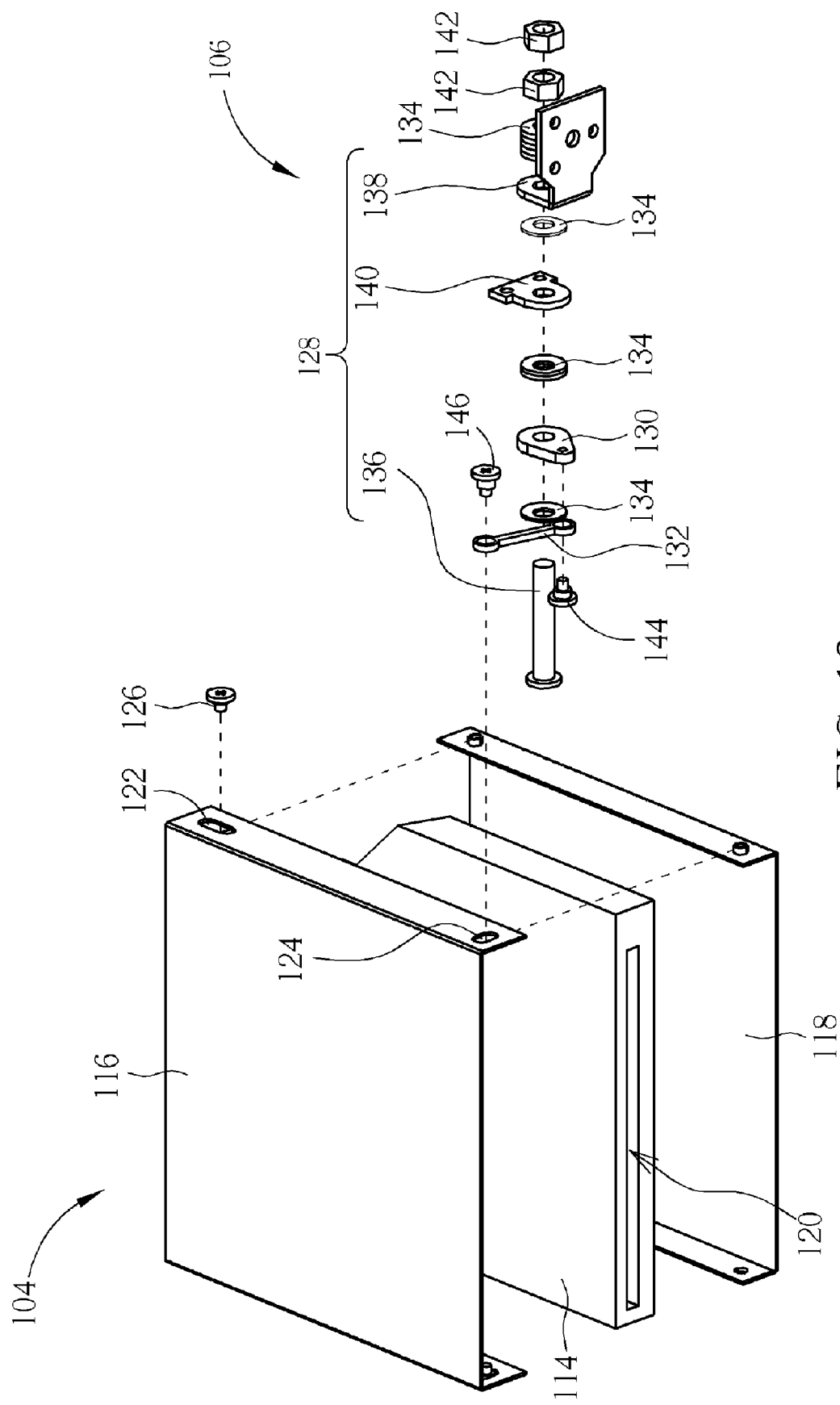
FIG. 12 is an exploded diagram of the chest and the linkage device in FIG. 11.

Finally, please refer to FIG. 11. FIG. 11 is a perspective diagram of a display module 100 according to the third embodiment of the present invention. The display module 100 comprises a display device 102, a chest 104, and a linkage device 106. A first opening 110 is formed at a display side 108 of the display device 102. The display device 102 may be an LCD. The chest 104 is disposed at a side of the display device 102 opposite to the display side 108. Next, please refer to FIG. 12. FIG. 12 is an exploded diagram of the chest 104 and the linkage device 106 in FIG. 11. As shown in FIG. 12, the chest 104 comprises a case 112 (As shown in FIG. 11), an electronic device 114, a frame 116, and a chassis 118. The electronic device 114 is installed inside the case 112. The electronic device 114 has a second opening 120 corresponding to the first opening 110 of the display device 102. The electronic device 114 may be a disk drive, such as an optical disk drive, a card reading drive, and so forth. The frame 116 is fixed to the case 112 and is disposed at a side of the electronic device 114. The frame 116 has a first guide rail 122 and a second guide rail 124. The chassis 118 is used for holding the electronic device 114. As shown in FIG. 12, the chest 104 further comprises a first screw 126. The first screw 126 is fixed to the chassis 118 and pivots at the frame 116 for allowing the chassis 118 to move along the first guide rail 122 of the frame 116. As shown in FIG. 11 and FIG. 12, the linkage device 106 pivots at the chassis 118 and fixed to the case 112 and the display device 102. In this embodiment, the linkage device 106 comprises a rotating shaft mechanism 128, a first connecting rod 130, a second connecting rod 132, and at least one positioning part 134. The rotating mechanism 128 comprises a rotating shaft 136, a first fixing base 138, and a second fixing base 140. The first fixing base 138 pivots at the rotating shaft 136 and is connected to the display device 102. That is, the first fixing base 138 and the rotating shaft 136 moves with the display device 102 together. The second fixing base 140 is disposed through the rotating shaft 136 and fixed to the case 112 of the chest 104 (as shown in FIG. 11). The first connecting rod 130 is disposed through the rotating shaft 136. The second connecting rod 132 pivots at the chassis 118 and the first connecting rod 130. The second connecting rod 132 is used for driving the chassis 118 with the rotation of the first connecting rod 130. The positioning part 134 is disposed through the rotating shaft 76. The positioning part 134 is used for providing friction force to the first connecting rod 130, the rotating shaft 136, and the first fixing base 138 so that the first connecting rod 130, the rotating shaft 136, and the first fixing base 138 may rotate with the display device 102 together. In this embodiment, the positioning part 134 may be a friction pad. Furthermore, as shown in FIG. 12, the linkage device 106 further comprises a screw nut 142, a second screw 144, and a third screw 146. The screw nut 142 is locked on the rotating shaft 136 for adjusting the friction force provided from the positioning part 134. The second screw nut 144 is fixed to the first connecting rod 130 and pivots at the second connecting rod 132 for allowing the first connecting rod 130 to rotate relative to the second connecting rod 132. The third screw 146 is fixed to the chassis 118 and pivots at the second connecting rod 132 for allowing the chassis 118 to move along the second guide rail 124 of the frame 116.

Figure 13:
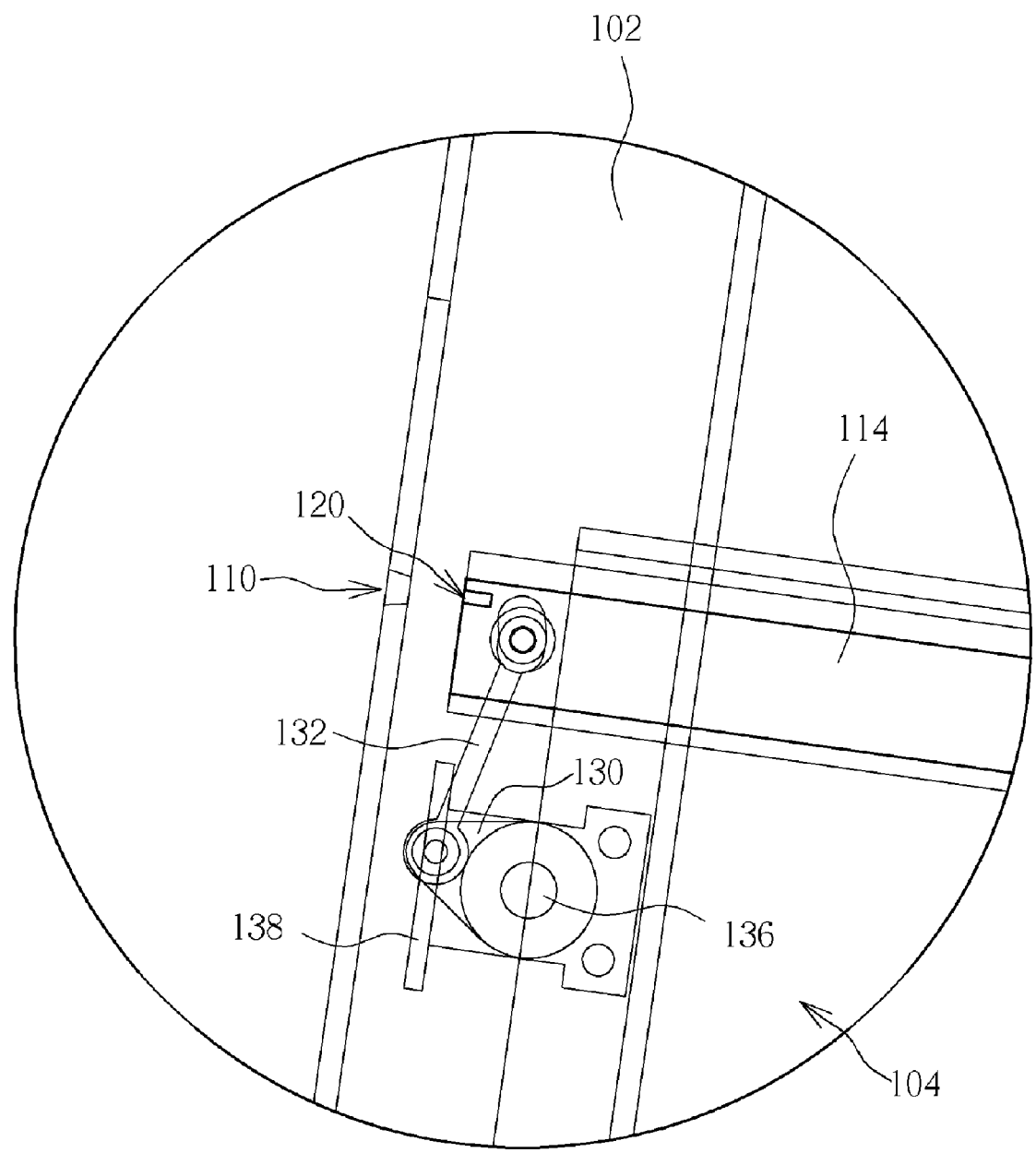
FIG. 13 is a partial enlarged diagram of the display module in FIG. 11.
Figure 14:
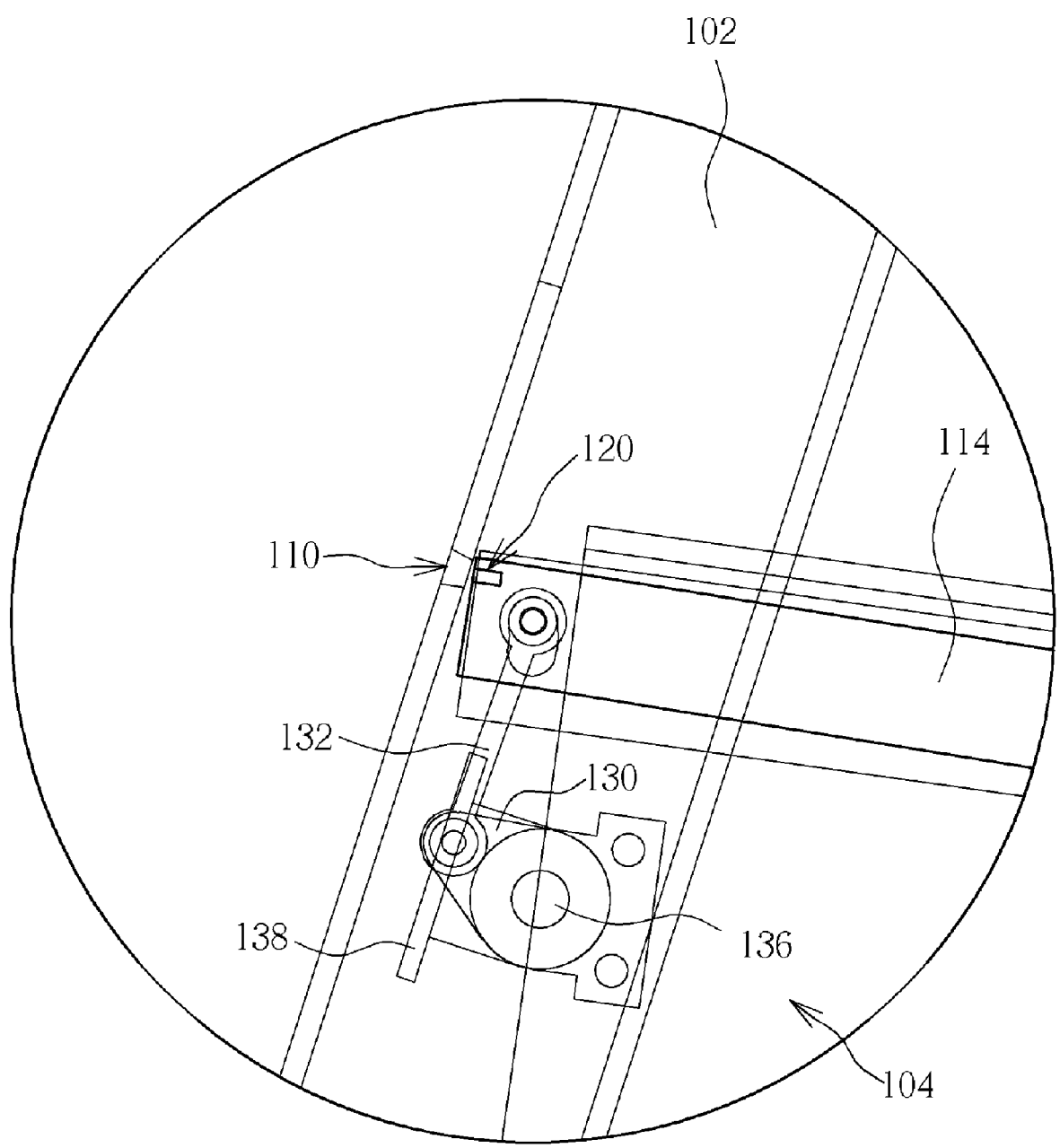
FIG. 14 is a partial perspective diagram of the display device and the chest after the display device in FIG. 11 rotates an angle clockwise relative to the chest.

More detailed description for the display device 102, the chest 104, and the linkage device 106 is provided as follows. Please refer to FIG. 13 and FIG. 14. FIG. 13 is a partial enlarged diagram of the display module 100 in FIG. 11. FIG. 14 is a partial perspective diagram of the display device 102 and the chest 104 after the display device 102 in FIG. 11 rotates an angle clockwise relative to the chest 104. As shown in FIG. 13 and FIG. 14, when the user pushes the display device 102 to rotate from a location shown in FIG. 13 to a location shown in FIG. 14 clockwise, the first opening 110 of the display device 102 may rotate to a location shown in FIG. 14 relative to the rotating shaft 136 accordingly. At the same time, with the rotation of the display device 102, the first fixing base 138 may also rotate the rotating shaft 136 and the first connecting rod 130 together by the friction force provided from the positioning part 134 since the first fixing base 138 of the linkage mechanism 128 is connected to the display device 102 and disposed through the rotating shaft 136 and the first connecting rod 130 is disposed through the rotating shaft 136, and therefore the second connecting rod 132 is driven to move. Further, as mentioned above, the second connecting rod 132 pivots at the chassis 118 and the chassis 118 may move along the first guide rail 122 of the frame 116. Therefore, when the first opening 110 of the display device 102 rotates to the location shown in FIG. 14 relative to the rotating shaft 136, the second connecting rod 132 may drive the chassis 118 to slide and rotate relative to first guide rail 122 and the second guide rail 124 at the same time for moving the second opening 120 of the electronic device 114 to the location shown in FIG. 14. After the first opening 110 of the display device 102 and the second opening 120 of the electronic device 114 move to the locations shown in FIG. 14 respectively, the first opening 110 and the second opening 120 may be positioned at the locations shown in FIG. 14 via the friction force provided from the positioning part 134. And as shown in FIG. 14, the positioned locations of the first opening 110 and the second opening 120 have the same horizontal height. To summarize, even though the user pushes the display device 102 to rotate clockwise relative to the chest 104 so as to shift the first opening 110 to the location shown in FIG.

Figure 15:
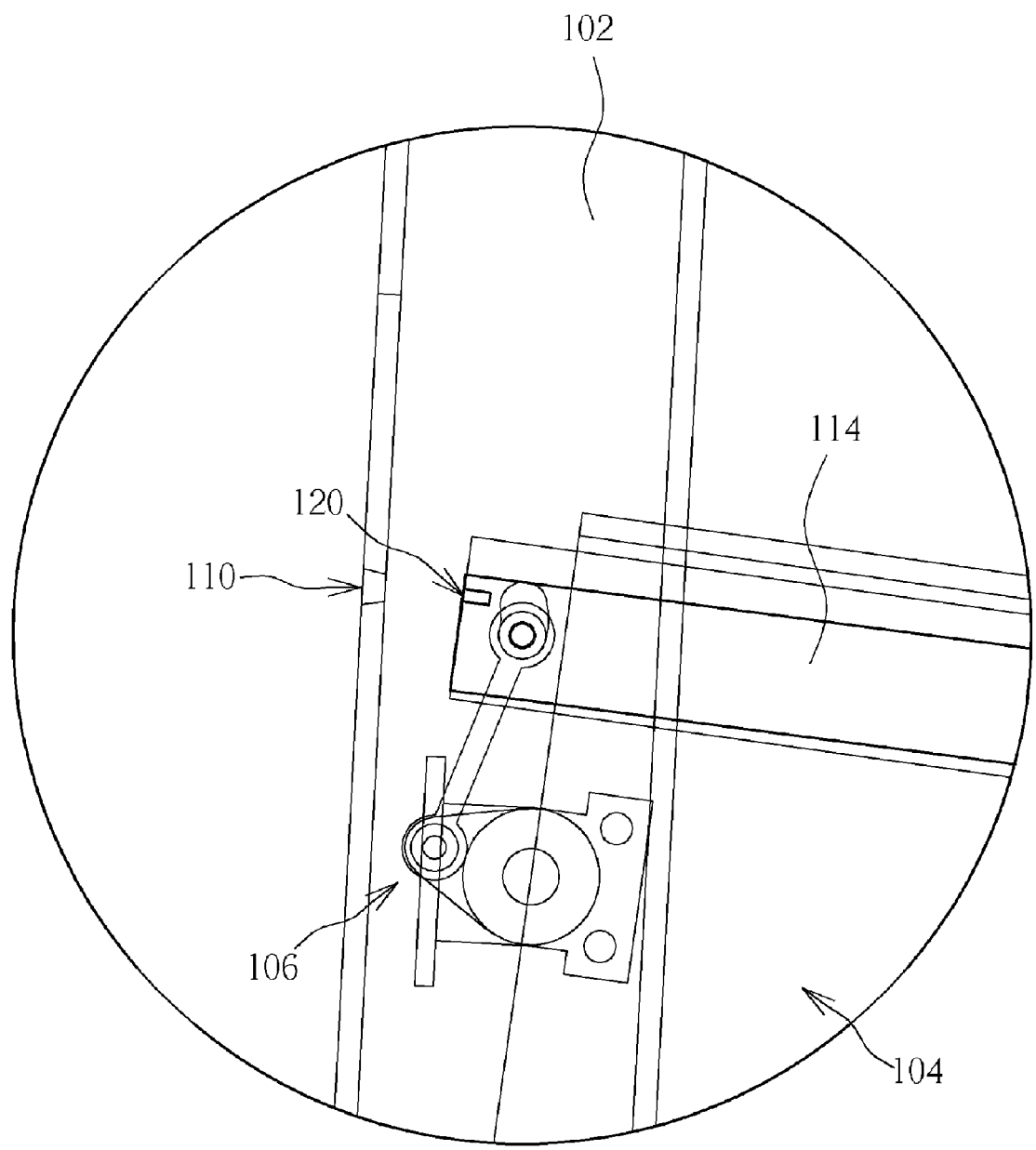
FIG. 15 is a partial perspective diagram of the display device and the chest after the display device in FIG. 11 rotates an angle counterclockwise relative to the chest.

14, the display module 110 may still drive the second opening 120 to move to the location shown in FIG. 14 via the connection of the linkage device 106 and the display device 102 and thereby cause the first opening 110 and the second opening 120 to be located at the same horizontal height. In such a manner, the prior art problem may be solved since the first opening 110 may be aligned with the second opening 120 at the same horizontal height via the aforementioned mechanism. Similarly, even if the user pushes the display device 102 to rotate counterclockwise relative to the chest 104 (as shown in FIG. 15), the display module 100 may still utilize the connection of the linkage device 106 and the display device 102 to align the second opening 120 to the first opening 110 that is shifted a distance accordingly so that the said storage medium may be inserted smoothly into the second opening 120 through the first opening 110.

Furthermore, when the second connecting rod 132 of the linkage device 106 pushes the chassis 118 to reach the top end or the bottom end of the second guide rail 124, the first connecting rod may start to run idly relative to the rotating shaft 136 since the friction force between the rotating shaft 136 and the first connecting rod 130 is less than the fixing force between the frame 116 and the case 112. As a result, the chassis 118 may be positioned at the position corresponding to the top end or the bottom end of the second guide rail 124. In other words, the rotating angle range of the chassis 118 is limited via the said structure design.

Compared with the prior art, in which a disk drive is disposed at a side of an LCD-PC or an opening of the LCD-PC is enlarged to make sure that a storage medium can be inserted smoothly into an insertion opening of an electronic device through the opening, the display module of the present invention disposes the opening at a display side of the LCD-PC instead for allowing the user to insert the storage medium into the disk drive smoothly and quickly. Furthermore, the display module of the present invention may solve the said problem that the opening is shifted a distance relative to the insertion opening of the disk drive accordingly when the user adjusts a display angle of an LCD screen of the LCD-PC. Therefore, the display module of the present invention may increase the convenience in use and the appearance quality of the LCD-PC at the same time.

Those skilled in the art will readily observe that numerous modifications and alterations of the device and method may be made while retaining the teachings of the invention.

What is claimed is:

1. A display module capable of adjusting a location of an opening of an electronic device, the display module comprising:
   a display device, a first opening being formed at a display side of the display device;
   a chest disposed at a side of the display device opposite to the display side, the chest comprising:
   a case;
      an electronic device installed inside the case, the electronic device having a second opening corresponding to the first opening;
      a frame fixed to the case and disposed at a side of the electronic device, the frame having a first guide rail; and
      a chassis pivotally installed in the first guide rail of the frame for holding the electronic device; and
   a linkage device pivotally connected to the chassis and fixed to the case and the display device for driving the chassis to move along the first guide rail of the frame when the first opening of the display device rotates to a first location so as to move the second opening of the electronic device to a second location corresponding to the first location.

2. The display module of claim 1, wherein the display device is a liquid crystal display (LCD).

3. The display module of claim 1, wherein the electronic device is an optical disk drive.

4. The display module of claim 1, wherein the electronic device is a card reading drive.

5. The display module of claim 1, wherein the chest further comprises a screw fixed to the chassis and pivotally connected to the frame for allowing the chassis to move along the first guide rail of the frame.

6. The display module of claim 1, wherein the linkage device is a rotating shaft mechanism.

7. The display module of claim 6, wherein the linkage device comprises:
   a rotating shaft;
   a first fixing base pivotally connected to the rotating shaft;
   a second fixing base disposed through the rotating shaft and fixed to the case of the chest;
   a third fixing base pivotally connected to the chassis and connected to the first fixing base and the display device for driving the chassis when the first opening of the display device rotates to the first location so as to move the second opening of the electronic device to the second location; and
   at least one positioning part disposed through the rotating shaft for providing the first fixing base with friction force so as to position the second opening at the second location.

8. The display module of claim 7, wherein the first location and the second location substantially have the same horizontal height.

9. The display module of claim 7, wherein the positioning part is a friction pad.

10. The display module of claim 7, wherein the linkage device further comprises a screw fixed to the chassis and pivotally connected to the third fixing base for allowing the chassis to rotate relative to the third fixing base.

11. The display module of claim 7, wherein the linkage device further comprises at least one screw nut locked on the rotating shaft for adjusting the friction force provided from the positioning part.

12. The display module of claim 6, wherein the linkage device comprises:
   a rotating shaft;
   a first fixing base pivotally connected to the rotating shaft and connected to the display device;
   a second fixing base disposed through the rotating shaft and fixed to the case of the chest;
   a third fixing base pivotally connected to the chassis and connected to the display device for driving the chassis when the first opening of the display device rotates to the first location so as to move the second opening of the electronic device to the second location; and
   at least one positioning part disposed through the rotating shaft for providing the first fixing base with friction force so as to position the second opening at the second location.

13. The display module of claim 12, wherein the first location and the second location substantially have the same horizontal height.

14. The display module of claim 12, wherein the positioning part is a friction pad.

15. The display module of claim 12, wherein the linkage device further comprises a screw fixed to the chassis and pivotally connected to the third fixing base for allowing the chassis to rotate relative to the third fixing base.

16. The display module of claim 12, wherein the linkage device further comprises at least one screw nut locked on the rotating shaft for adjusting the friction force provided from the positioning part.

17. The display module of claim 1, wherein the linkage device comprises:
   a rotating shaft mechanism comprising:
      a rotating shaft;
      a first fixing base pivotally connected to the rotating shaft and connected to the display device; and
      a second fixing base disposed through the rotating shaft and fixed to the case of the chest;
   a first connecting rod disposed through the rotating shaft;
   a second connecting rod pivotally connected to the chassis and the first connecting rod for driving the chassis with the rotation of the first connecting rod so as to move the second opening of the electronic device to the second location; and
   at least one positioning part disposed through the rotating shaft for providing the first fixing base and the first connecting rod with friction force so as to position the second opening at the second location.

18. The display module of claim 17, wherein the first location and the second location substantially have the same horizontal height.

19. The display module of claim 17, wherein the positioning part is a friction pad.

20. The display module of claim 17, wherein the frame further has a second guide rail, and the linkage device further comprises a screw fixed to the chassis and pivotally connected to the second connecting rod for allowing the chassis to move along the second guide rail of the frame.

21. The display module of claim 17, wherein the linkage device further comprises a screw fixed to the first connecting rod and pivotally connected to the second connecting rod for allowing the first connecting rod to rotate relative to the second connecting rod.

22. The display module of claim 17, wherein the rotating shaft mechanism further comprises at least one screw nut locked on the rotating shaft for adjusting the friction force provided from the positioning part.

\* \* \* \* \*

UNITED STATES PATENT AND TRADEMARK OFFICE
CERTIFICATE OF CORRECTION

PATENT NO. : 7,630,194 B1
APPLICATION NO. : 12/249959
DATED : December 8, 2009
INVENTOR(S) : Chih-Shiun Wu It is certified that error appears in the above-identified patent and that said Letters Patent is hereby corrected as shown below:

On the title page, item (75), correct the residence of the inventor from "Taipei Country" to "Taipei County"

Signed and Sealed this

Sixteenth Day of March, 2010

David J. Kappos
*Director of the United States Patent and Trademark Office*